United States Patent
Tsuchiya et al.

(10) Patent No.: US 7,212,357 B2
(45) Date of Patent: May 1, 2007

(54) POSITIONING STRUCTURE

(75) Inventors: Kazuyuki Tsuchiya, Saitama (JP); Koji Ogaki, Saitama (JP); Masayuki Inamoto, Saitama (JP)

(73) Assignee: Fujinon Corporation

( * ) Notice: Subject to any disclaimer, the term of this patent is extended or adjusted under 35 U.S.C. 154(b) by 0 days.

(21) Appl. No.: 11/391,277

(22) Filed: Mar. 29, 2006

(65) Prior Publication Data

US 2006/0221471 A1   Oct. 5, 2006

(30) Foreign Application Priority Data

Mar. 30, 2005 (JP) ............ P.2005-099083
Sep. 22, 2005 (JP) ............ P.2005-275051

(51) Int. Cl.
G02B 7/02 (2006.01)
(52) U.S. Cl. .............. 359/819; 359/811; 359/813; 359/822; 359/823
(58) Field of Classification Search ......... 359/819, 359/811, 813, 815, 822, 821, 823
See application file for complete search history.

(56) References Cited

FOREIGN PATENT DOCUMENTS

JP   2000-187274 A   7/2000
JP   2003-114479 A   4/2003

Primary Examiner—Alicia M. Harrington
Assistant Examiner—Brandi Thomas
(74) Attorney, Agent, or Firm—Birch, Stewart, Kolasch & Birch, LLP

(57) ABSTRACT

A positioning structure having a positioning projection on attaching surface is provided. The attaching surface is inclined within an acute angle with respect to a direction orthogonal to an opening and closing direction of a mold for forming the surface. The positioning projection formed on the attaching surface is molded simultaneously by the metallic molding into a truncated right circular conical shape with a tapered trapezoid section that has a tapered surface inclined within an acute angle with respect to a direction perpendicular to the attaching surface on the outer circumference, and has a tapered front end extending in the perpendicular direction. When the angle of inclination of the attaching surface with respect to the direction orthogonal to the opening and closing direction of the mold is defined as "α", and the angle of inclination of the tapered surface with respect to the direction perpendicular to the attaching surface is defined as "β", β−α>0 is satisfied.

7 Claims, 8 Drawing Sheets

POSITIONING STRUCTURE

FIELD OF THE INVENTION

The present invention relates to a positioning structure for accurately attaching parts to each other, and in particular, to a positioning structure to be used for assembling parts requiring attaching accuracy such as optical parts and lens barrels, etc., to be installed in projectors or the like.

BACKGROUND OF THE INVENTION

In the related art, an RPTV (rear projection television) which projects on a large-size screen from a projector unit set behind the screen is generally known (JP-A-2003-114479). RPTV has widely spread due to its lower unit cost per screen size than that of a plasma or liquid crystal televisions. However, it is disadvantageous that the projector unit set behind the screen increases the thickness.

Therefore, an RPTV which is thinned by restraining the increase in thickness due to the length of the projector lens by bending the projector lens to be set in the projector unit into a roughly V shape has been proposed (JP-A-2000-187274).

The projector lens of Patent Document 2 has an optical path converting means such as a prism that bends the optical axis of image light that has passed through a first optical lens group forming the projector lens at a predetermined angle to make the image light on the bent optical axis incident on the second optical lens group.

For RPTVs, cost reduction has been demanded, and many parts are plastic-made molded parts. Particularly, holder parts for holding the lens and prism need high accuracy. To attach parts for holding such optical parts and optical parts to be attached to the holder parts, means for positioning by fitting a positioning pin and a positioning hole is used.

However, to bend a complicated optical path as described above, many tilt surfaces are used since only right-angle surfaces with excellent moldability cannot form the part shape. Therefore, when positioning projections extending perpendicularly to a surface of the outer surface of the molded part which is not orthogonal to the opening and closing direction of a mold for forming the molded part are formed on this surface, a part of the positioning projections becomes undercut and makes it impossible to extract the molded item from the mold.

Therefore, in the related art, as shown in FIG. 11, when molding or after molding, a positioning pin 100 prepared in advance is molded as an insert, post-insert, or outsert part. This positioning pin has a columnar shape whose embedded portion 102 into a part 101 projects parallel to the mold opening and closing direction, and the front end portion 103 that fits in a positioning hole of the other part has a columnar shape extending and projecting perpendicularly to an inclined plane that is not orthogonal to the mold opening and closing direction. By using such a positioning pin having a shape whose line passing through the center of the embedded portion 102 and the center of the front end portion 103 is not straight (non-axisymmetric shape), the positioning pin 100 is molded integrally on the surface 106 orthogonal to the mold opening and closing direction.

However, the positioning pin is non-axisymmetric and complicated in shape, so that the pin cannot be accurately formed, and to obtain high accuracy, the processing costs increase. In addition, in insert, post-insert, or outsert molding, the positioning pin 100 must be formed separately, and this increases the costs further.

SUMMARY OF THE INVENTION

An object of an illustrative, non-limiting embodiment of the invention is to provide a positioning structure devised so that positioning means can be formed at low costs with high accuracy on a surface of an optical part not orthogonal to the mold opening and closing direction.

(1) In an positioning structure according to an exemplary embodiment of the invention, one of parts that performs positioning is formed by metallic molding by using a resin material, and an attaching surface provided on one of the parts is inclined within an acute angle with respect to a direction orthogonal to an opening and closing direction (extracting direction) of a mold for forming the surface, and positioning projections or holes formed integrally so as not to become undercut on the attaching surface are used for positioning. Namely, the positioning projections or holes provided on the attaching surface of one of the parts are formed simultaneously with the metallic molding, and the shapes of the outer surfaces or inner surfaces to come into contact with positioning holes or projections of the other part are formed into side surface shapes with rotationally symmetric trapezoid sections having tapered side surfaces inclined within an acute angle with respect to a perpendicular to the attaching surface of one of the parts, and when the angle of inclination of the attaching surface with respect to the direction orthogonal to the opening and closing direction of the mold is defined as "α" and the angle of inclination of the tapered surface with respect to the perpendicular is defined as "β", β−α>0 is satisfied.

When the molding accuracy of the positioning hole is measured with a three-dimensional measure, the positioning hole is observed with a microscope perpendicularly to the first attaching surface. At this time, the tapered concave portion changes its diameter according to its depth, so that the position may not be accurately measured. Therefore, it is preferable that concave portions having straight portions parallel to the mold opening and closing direction are provided so as to extend from the contours of the bottoms of the positioning holes of one of the parts. Thereby, the tapered bottoms of the positioning holes become further extended concaves due to the concave portions, so that they can be clearly detected in measurement with a three-dimensional measure. Preferably, the concave portions are columnar concave portions whose outer circumferences become straight lines parallel to the opening and closing direction of the mold, for example. Providing such concave portions so as to extend from the embedded portions of the mold for forming the positioning projections are also convenient for measurement of the size of the mold.

As described in the related art, in some projectors, an optical system for converting an optical path such as a prism or mirror is used which bends an optical axis of image light outgoing from a rear lens group of two divisions of a projector lens and makes the image light incident on an front lens group along the bent optical axis. The front and rear lens groups comprising two divisions of a projector lens in a projector, the front lens group being a front division of the two divisions in a direction of the principal optical axis, and the rear lens group is a rear division of the two divisions in the direction of the principal optical axis. In an optical system holder that holds such an optical system, a reference surface which a rear holder frame that holds a part or the whole of the rear lens group is attached to and is parallel with the opening and closing direction of the mold, and an attaching surface which is inclined within an acute or obtuse angle with respect to the reference surface and a front holder frame that holds the front lens group or an intermediate member that supports the front holder frame is attached, are formed. When the optical system holder including the attaching surface inclined with respect to the direction orthogonal to the reference surface is made of a resin material by metallic molding, the reference surface is formed by a sliding type that opens and closes in the direction orthogonal to the reference surface, and the attaching surface is formed by a slide core that slides in the direction orthogonal to the opening and closing direction.

(2) In a positioning structure according to another exemplary embodiment of the invention, positioning projection parts separately formed are used. When the positioning projection parts are used, if the positioning projection parts are formed into complicated shapes, the dimensional accuracy is hardly obtained. To obtain dimensional accuracy, the processing costs increase. Therefore, the positioning projections are formed so as to be entirely rotational symmetrical by forming a disk-shaped flange, and a projection and a spherical projection projecting in the axial direction passing through the center of the flange opposite each other from both surfaces of the flange. The projection fits in a positioning hole formed in an attaching surface of the other part, and the spherical projection is formed by a spherical surface having a height equal to or less than the radius. The positioning hole formed in the attaching surface is formed by an inclined plane that comes into contact with the outer circumference of the spherical projection at least at three or more points, or a concave spherical surface having the same radius as that of the spherical projection and a depth equal to the height of the spherical projection. Of the surfaces of the flange, the surface provided with the spherical projection comes into entire contact with a plane of the attaching surface of one of the parts when the spherical projection fits in the positioning hole.

When this positioning hole is formed by a spherical surface, the spherical surface is set to have the same radius as that of the spherical projection and have a depth with the same length as the height of the spherical projection. Thereby, the outer circumference of the spherical projection comes into entire contact with the positioning hole without gaps. When the positioning hole is formed by inclined planes, for example, it is formed by surfaces that uniquely determine the position and posture of the spherical projection, for example, a plurality of inclined planes to become a V shape in the respective sections in the X and Y directions of a two-dimensional plane.

According to this, the positioning holes provided on the attaching surface of one of the parts are formed by inclined planes or spherical surfaces that come into contact with the outer circumferences of the spherical projections with a height equal to or less than the radius at three or more points, so that the mold for forming this surface is prevented from making the positioning holes undercut, and therefore, the positioning holes can be easily formed. In addition, the projections provided on the opposite surfaces of the spherical projections across the flanges are formed into truncated right circular conical shapes with trapezoid sections or columnar shapes, the positioning projections can be made rotationally symmetric. Therefore, they can be easily formed by cutting and molding with high accuracy. The spherical projections are shaped into spherical crown shapes formed by cutting a sphere at a plane, however, without limiting to this, the spherical projections can also be formed into spherical zone shapes by cutting a sphere at two planes. It is also possible that the positioning projections are insert-, post-insert-, or outsert-molded on the attaching surface of the other part, and the spherical projections are exposed on the attaching surface of the one part.

As described above, according to the positioning structure of the invention as set forth in (1), an attaching surface of one of the parts metallically molded from a resin is inclined within an acute angle with respect to a direction orthogonal to an opening and closing direction of the mold for forming the surface, and the outer surface or inner surface to come into contact with positioning projections or holes is formed to extend perpendicularly to the one attaching surface in a side surface shape with a rotationally symmetric trapezoid section having a tapered side surface inclined within an acute angle with respect to a perpendicular to the attaching surface on the outer circumference, that is, in a truncated right circular conical shape simultaneously with the metallic molding, and when the angle of inclination of the attaching surface with respect to the direction orthogonal to the opening and closing direction of the mold is defined as "a" and the angle of inclination of the tapered surface with respect to the perpendicular is defined as "b", b−a>0 is satisfied. Therefore, the positioning projections or holes can be easily molded from the same material as that of one of the parts. Thereby, the positioning projections or holes can be formed with high positional and shaping accuracy, and in addition, the use of the same material reduces the costs, and the molding cycle can be shortened since no positioning pin is used, and this realizes mass production at low costs.

In addition, according to the invention as set forth in (2), a positioning projection whose one of the projections to be fitted in both positioning holes is shaped into a spherical projection is used, so that positioning holes having positioning surfaces to come into contact with the spherical projections at three or more points can be formed in one attaching surface inclined within an obtuse angle with respect to a plane orthogonal to the opening and closing direction of the mold, so that the positioning structure can be easily formed with high accuracy at low costs without causing undercut by metallic molding.

DETAILED DESCRIPTION OF THE INVENTION

Figure 1:
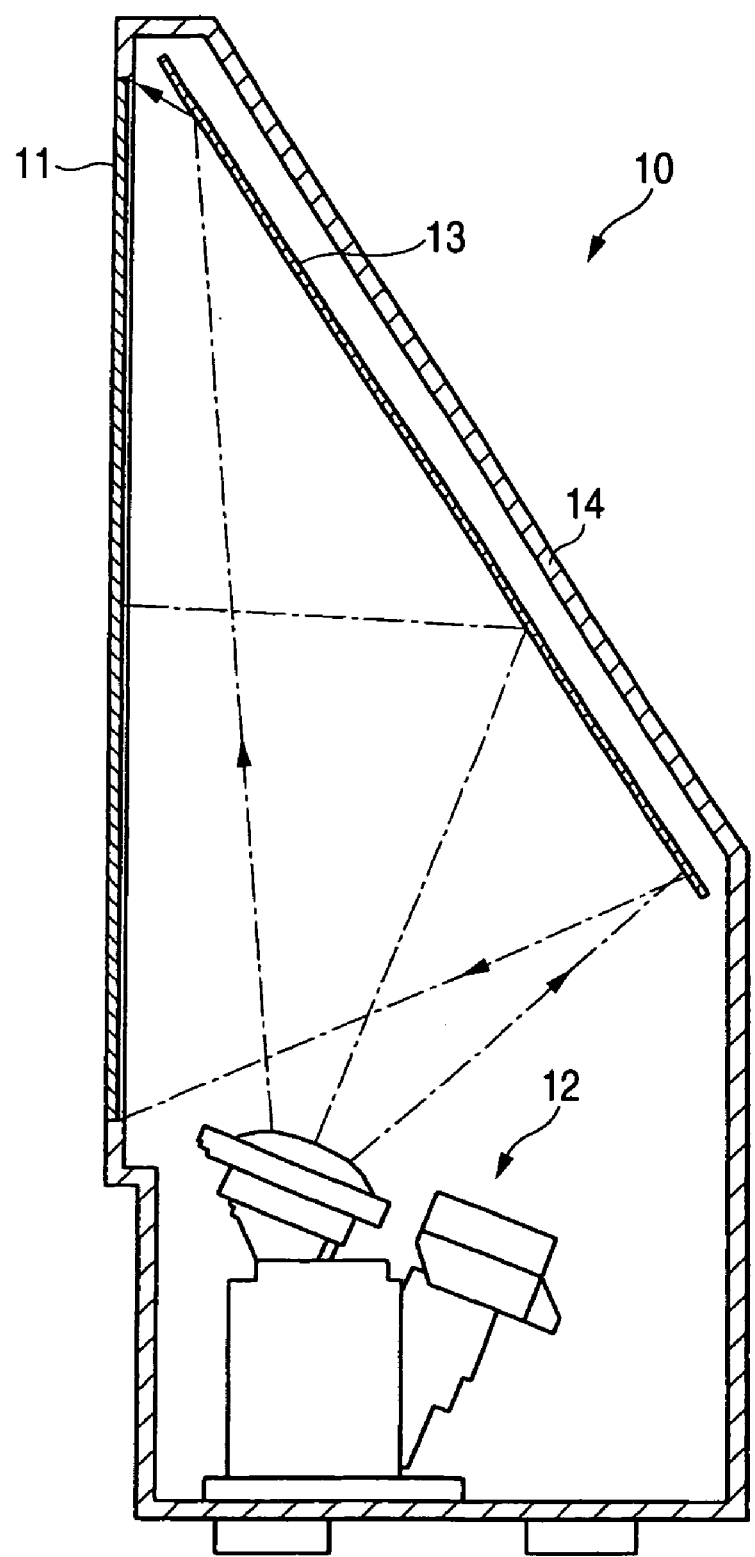
FIG. 1 is an explanatory view of an outline of a rear projector using the invention.

As shown in FIG. 1, the rear projector 10 includes a transmitting type rear screen 11 on which an image is projected, a projector unit 12 that generates image light from illuminating light and outputs it, and a back mirror 13 that reflects the image light that has exited from the projector unit 12 toward the rear screen 11.

The projector unit 12 and the back mirror 13 are installed inside a casing 14, and the rear screen 11 is provided at the opening of the casing 14. The rear screen 11 has a rectangular shape whose longer sides are set horizontally. The rear screen 11 is irradiated with image light from the back side, and a projected image is observed from the front side. The back mirror 13 has a trapezoid shape whose upper side is long and lower side is short, and is inclined with respect to the rear screen 11.

Figure 2:
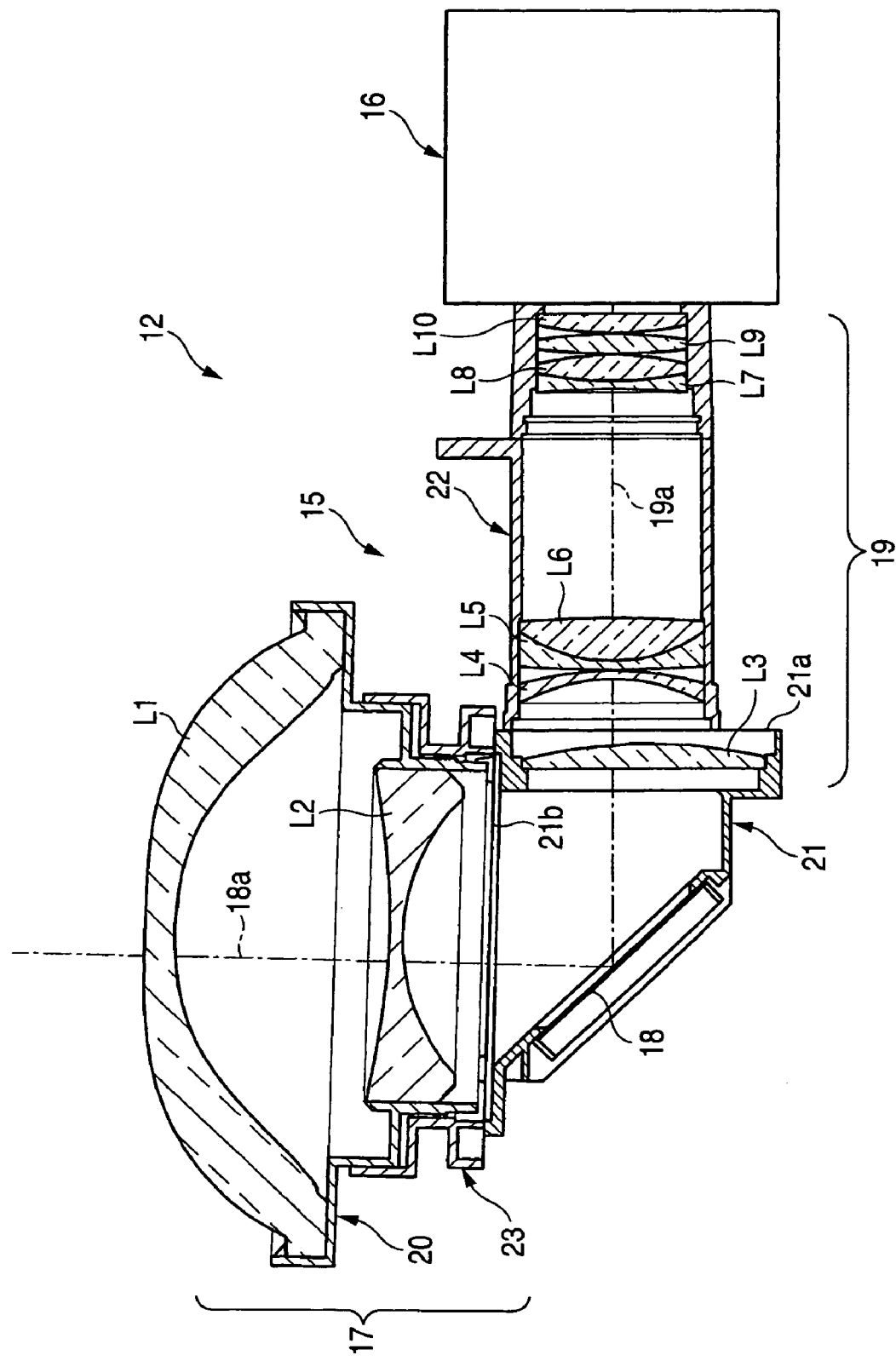
FIG. 2 is a sectional view of an outline of a projector lens.

The projector unit 12 includes, as shown in FIG. 2, a projector lens 15 and an image light generator 16. The image light generator 16 generates image light by receiving illuminating light with energy distribution equalized by light guide means such as a rod integrator irradiated from a light source and optically modulating the light. The projector lens 15 projects the image light generated by the image light generator 16 on the rear screen 11.

The projector lens 15 includes a first lens group 17, a light path bending mirror 18, and a second lens group 19. The second lens group 19 has a principal optical axis 19a parallel to the path of the image light outgoing from the image light generator 16. The light path bending mirror 18 is a plane mirror, and is provided between the first lens group 17 and the second lens group 19. The light path bending mirror 18 bends the principal optical axis 19a of color-composed image light at an angle other than the right angle, for example, at an acute angle. The first lens group 17 is provided to face the back mirror 13.

The first lens group 17 includes, in order from the rear screen 11 side, a first lens L1 and a second lens L2, and these are held by a first lens holder frame 20. The second lens group 19 includes, in order from the rear screen 11 side, third through tenth lenses L3 through L10. Among these, the third lens L3 and the light path bending mirror 18 are held by an optical system holder (one of the parts) 21. The lenses L4 through L10 of the residual second lens group are held by a second lens holder frame 22.

The optical system holder 21 is provided with a reference surface 21a to which the second lens holder frame 22 is attached. On the other hand, the first lens holder frame 20 is attached to the attaching surface (attaching surface of one of the parts) 21b of the optical system holder 21 via an intermediate member (the other one of the parts) 23. The intermediate member 23 and the first lens holder frame 20 are screwed and coupled to each other, and by rotating the first lens holder frame to the intermediate member 23 for screw-coupling, the first lens holder frame 20 moves along the bent optical axis 18a and adjusts the focus of the projector lens 15.

Figure 3:
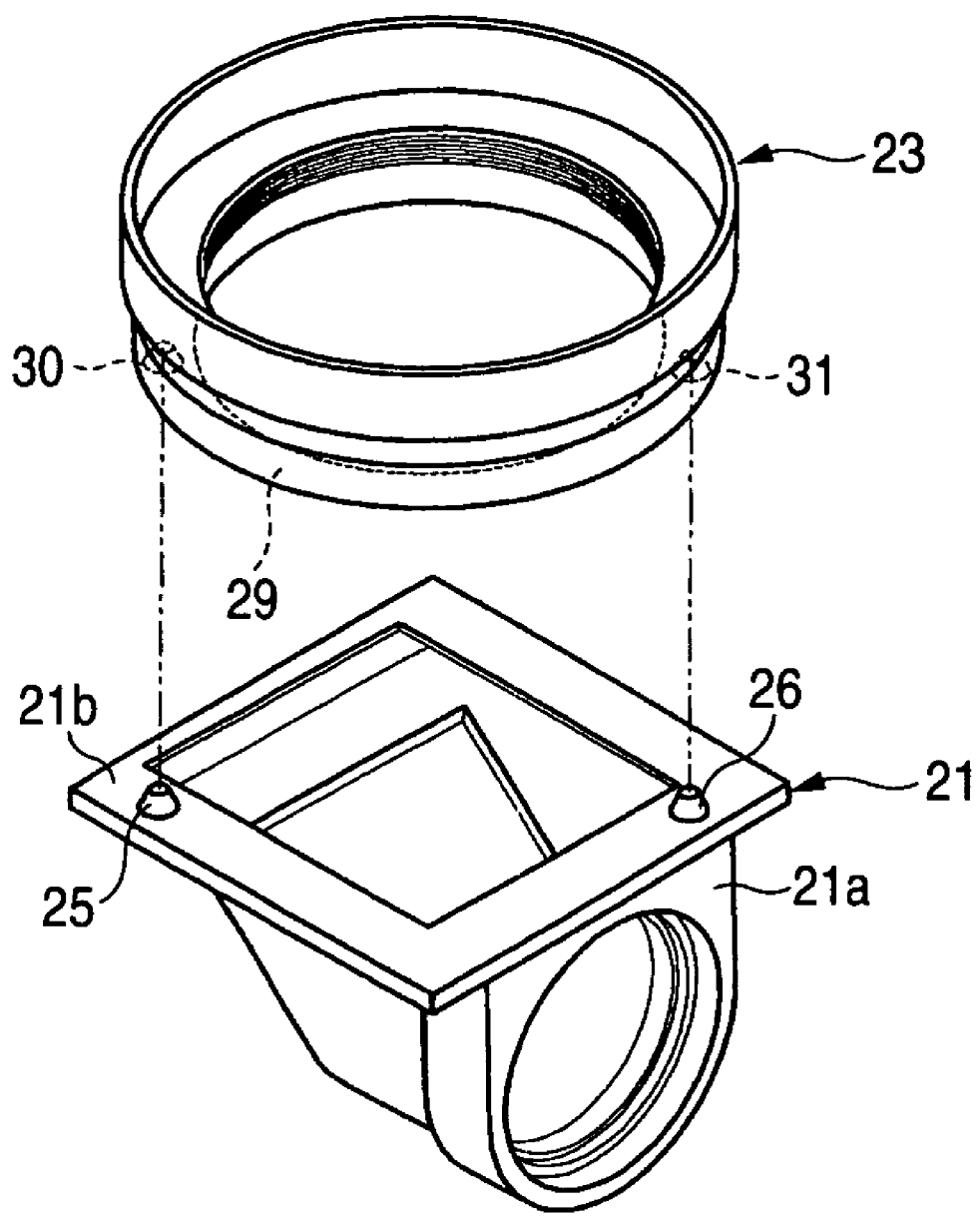
FIG. 3 is a perspective view of an intermediate member and an optical system holder.

To an attaching surface 21a of the optical system holder 21, the intermediate member 23 is attached. The reference surface 21a is orthogonal to the principal optical axis 19a of the image light, and the attaching surface 21b is orthogonal to the bent optical axis 18a that is a result of bending of the principal optical axis of the image light by the light path bending mirror 18. The bent optical axis 18a is at an obtuse angle with respect to the principal optical axis 19a, so that the attaching surface 21b is inclined at an obtuse angle with respect to the reference surface 21a. The optical system holder 21 and the intermediate member 23 are accurately attached as shown in FIG. 3 by fitting a plurality of positioning projections 25 and 26 provided on the attaching surface 21b and positioning holes 30 and 31 provided on an attaching surface (the other attaching surface) 29 of the intermediate member 23. The positioning projections 25 and 26 project perpendicularly to the attaching surface 21b.

Figure 4:
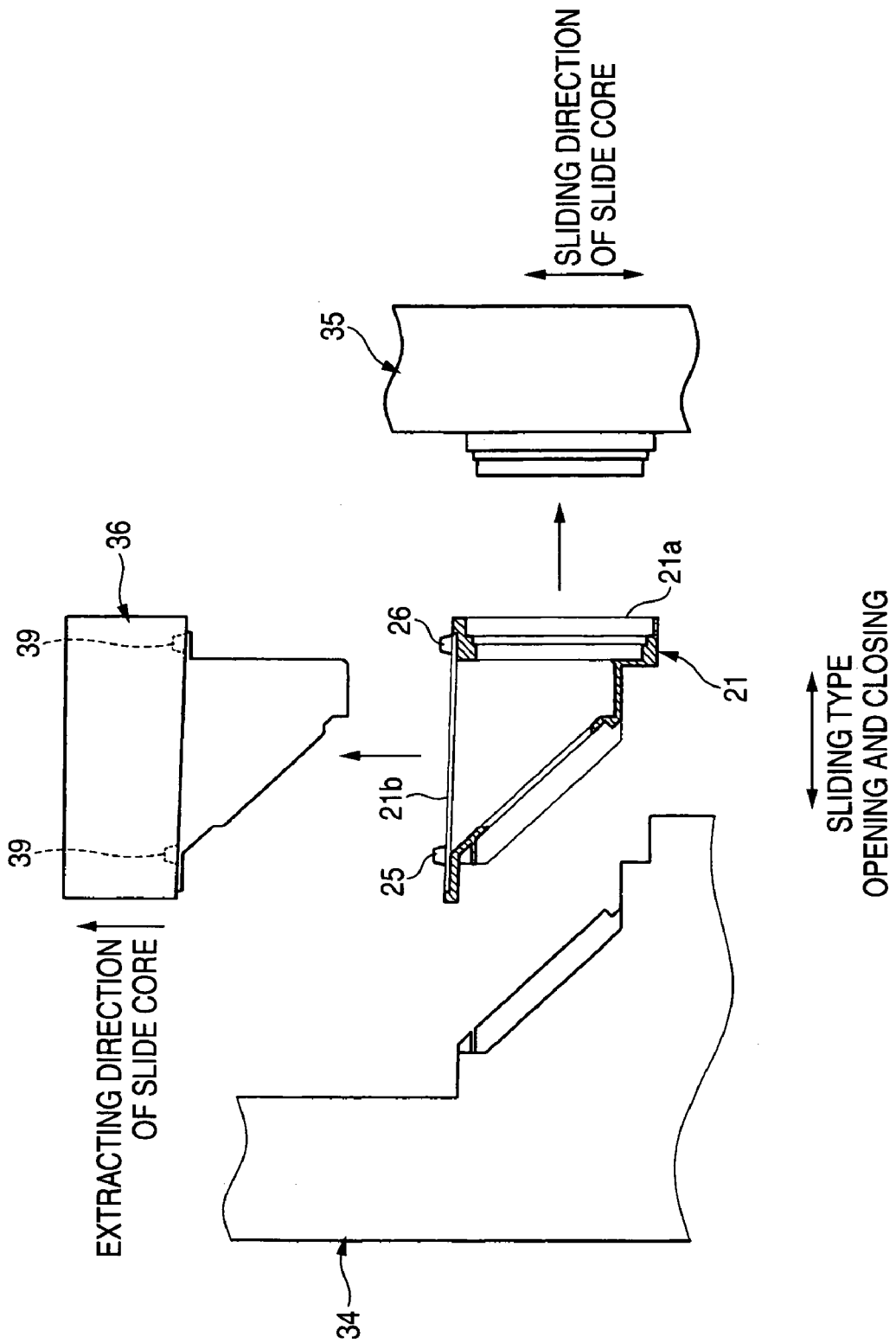
FIG. 4 is an explanatory view of a split sliding type mold for molding the optical system holder.

The optical system holder 21 is a resin-made part formed by injection molding by using a split sliding type mold including a fixed mount type 34, a sliding type 35, and a slide core 36 as shown in FIG. 4. The sliding type 35 is linearly opened from and closed to the fixed mount type 34, and is for forming the reference surface 21a in the direction orthogonal to this opening and closing direction. The slide core 36 is slid in the direction orthogonal to the opening and closing direction by interlocking with the opening and closing of the sliding type 35 with respect to the fixed mount type 34 due to an interlocking mechanism such as an unillustrated inclined pin. This slide core 36 is a mold for forming the attaching surface 21b and the positioning projections 25 and 26. As the interlocking mechanism, it is also possible that an hydraulic cylinder or air cylinder is used to operate the slide core 36.

Figure 5:
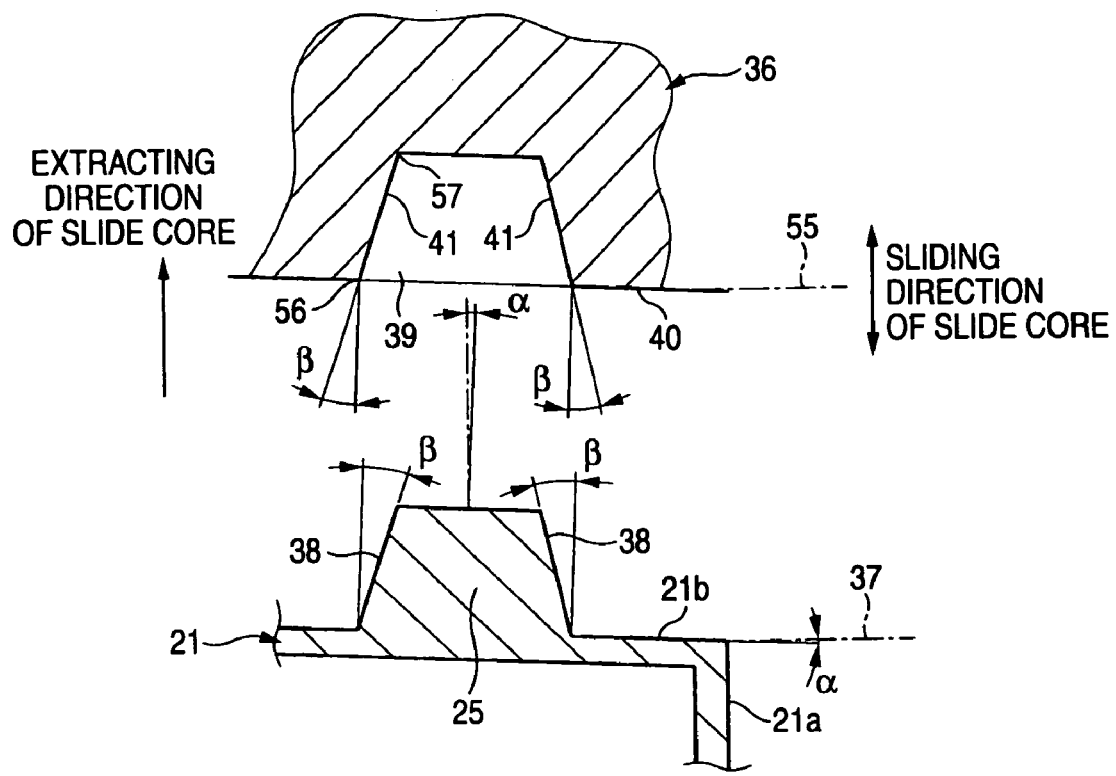
FIG. 5 is a sectional view of a main part of a positioning projection and a slide core for forming the positioning projection.

The attaching surface 21b is at an obtuse angle with respect to the reference surface 21a as shown in FIG. 5, and is inclined by an angle α with respect to the surface orthogonal to the reference surface 21a, that is, the surface 37 orthogonal to the sliding direction of the slide core 36. Therefore, the positioning projections 25 and 26 also project in the direction inclined by the angle α with respect to the sliding direction of the slide core 36.

A positioning pin to be used for insert molding generally has a columnar front end portion to be inserted into a positioning hole of the other part. Due to this columnar shape, the front end portion is erected unparallel to the opening and closing direction of the mold, so that a portion projecting over the sliding direction of the slide core becomes undercut. Therefore, to avoid this undercut portion, in this embodiment, the positioning projections 25 and 26 are molded in truncated right circular conical shapes having tapered surfaces 38 inclined by an angle β with respect to the direction perpendicular to the attaching surface 21b on the circumferential surfaces, that is, in tapered trapezoid sections. The angle β is an acute angle with respect to a perpendicular to the attaching surface 21b.

Therefore, engraved portions 39 formed on the slide core 36 to form the positioning projections 25 and 26 are also formed in truncated right circular conical shapes having tapered surfaces 41 inclined by the angle β with respect to the direction orthogonal to the surface 40 for forming the attaching surface 21b. This angle β is also an acute angle with respect to the perpendicular to the surface 40. It is preferable that, when the angle of the tapered surface 38 with respect to the direction orthogonal to the attaching surface 21b is defined as "β" and the angle of inclination of the attaching surface 21b with respect to the direction orthogonal to the mold opening and closing direction is defined as "α", the tapered surfaces 38 of the positioning projections 25 and 26 are formed so as to satisfy β−α>0, that is, β>α since this reliably prevents the undercut. As the positioning projections 25 and 26, without limiting to the truncated right circular conical shape, they may be formed into right circular conical shapes with triangular sections.

Figure 6:
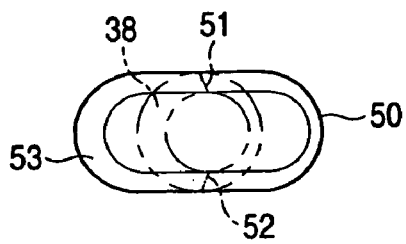
FIG. 6 is a front view of another example in which the positioning hole is formed into a slot.
Figure 7:
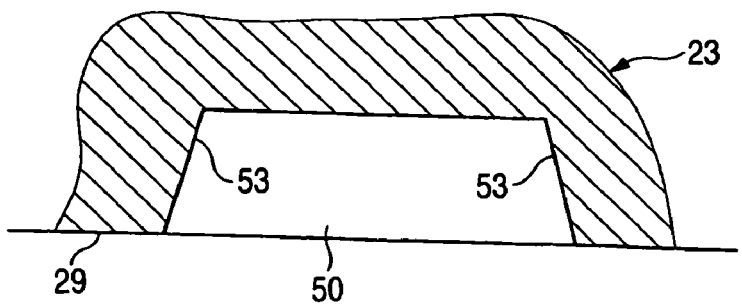
FIG. 7 is a sectional view of the positioning slot described in FIG. 6.

The positioning holes 30 and 31 are shaped into truncated right circular conical shapes, that is, shapes with tapered trapezoid sections so as to come into contact with the entire tapered surfaces 38 of the positioning projections 25 and 26. The intermediate member 23 having these positioning holes 30 and 31 are also formed by metallic molding by using a resin material. The positioning holes 30 and 31 can also be formed into slots 50 with trapezoid sections having tapered surfaces 53 with the same inclination so as to come into contact with two portions 51 and 52 at rotational symmetrical positions of the tapered surface 38 as shown in FIG. 6 and FIG. 7.

When inspecting the dimensions of the mold, the dimensions are accurately measured with a three-dimensional measure. With the three-dimensional measure, measurement is made by using a microscope. The positioning holes 30 and 31 are tapered concave portions, so that their diameters change according to the depths. Therefore, it is difficult to accurately measure the positions of the positioning holes 30 and 31 with the three-dimensional measure.

Figure 8:
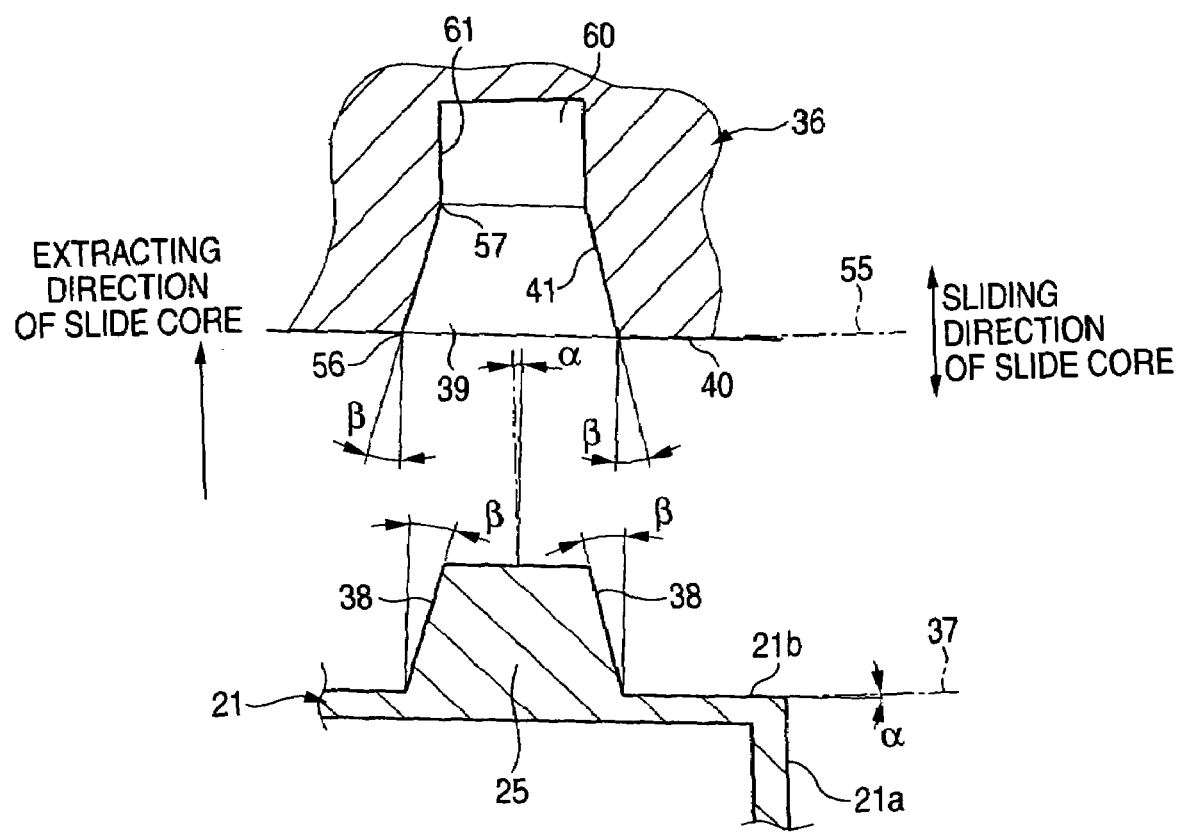
FIG. 8 is a sectional view of another example in which a concave portion with a straight portion parallel to the sliding direction of the slide core is formed in an engraved portion of the slide core for forming the positioning projection.

Therefore, as shown in FIG. 8, in a deeper portion of the engraved portion 39 of the slide core 36, a concave portion 60 is formed continuously. The concave portion 60 has a columnar shape with circumferential surface 61 parallel to the sliding direction of the slide core 36. Thereby, at the time of measurement with the three-dimensional measure, the contour of the inner circumference 57 is prevented from being rounded, so that the contour of the inner circumference 57 can be clearly recognized, and accurate measurement with the three-dimensional measure is realized. The depth of the concave portion 60 can be set to any depth as long as the contour of the inner circumference 57 can be clearly viewed.

Figure 9:
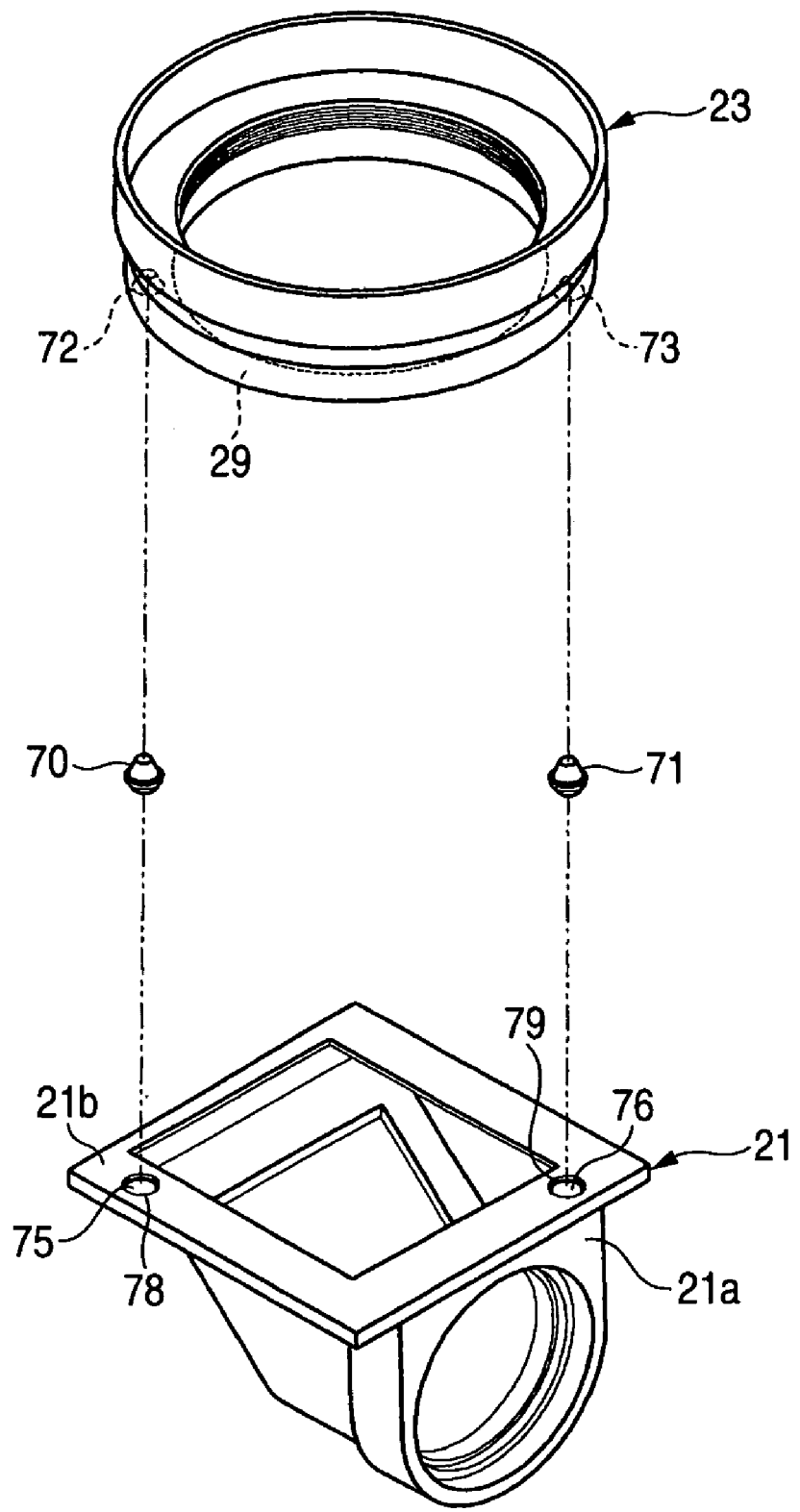
FIG. 9 is a perspective view of another embodiment in which a positioning projection parts having a spherical projection is separately used to position the intermediate member and the optical system holder.

FIG. 9 shows an embodiment in which the intermediate member 23 and the optical system holder 21 are positioned by a plurality of separately formed positioning projection parts 70 and 71. On the attaching surface 29 of the intermediate member 23, positioning holes 72 and 73 are formed simultaneously by metallic molding. On the attaching surface 21b of the optical system holder 21, concave portions 78 and 79 and positioning holes 75 and 76 provided at the bottoms of the concave portions 78 and 79 are formed simultaneously by metallic molding.

Generally, as the positioning projections, a projection to be fitted in the positioning hole provided in the intermediate member 23 and a projection to be fitted in the positioning hole provided in the optical system holder 21 are made to project in directions opposite each other, and both projections are shaped into truncated right circular conical shapes or columnar shapes. The attaching surface 21b of the optical system holder 21 is inclined at an acute angle α with respect to the surface 37 orthogonal to the sliding direction (mold extracting direction) of the slide core 36. Therefore, the positioning projection is formed into a non-axisymmetric shape having projections whose axes are bent.

Figure 10:
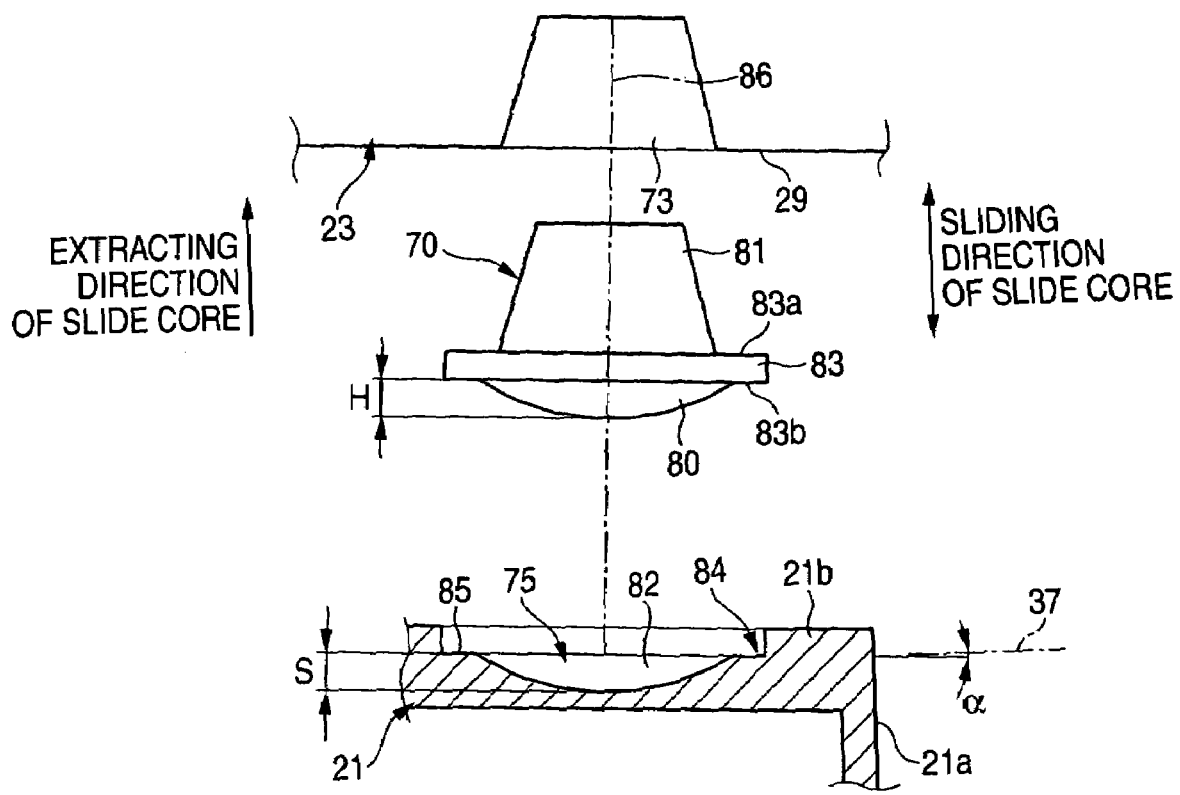
FIG. 10 is an explanatory view of the positioning holes and the positioning projection parts of both parts described in FIG. 9.
Figure 11:
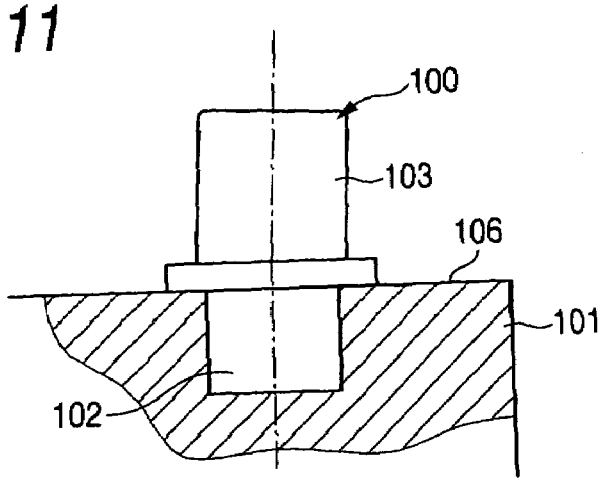
FIG. 11 is an explanatory view for explaining metallic molding by using an insert pin described in the related art.

However, the positioning projection part 70 of this embodiment is formed so that, as shown in FIG. 10, the outer circumference of the projection (spherical projection) 80 to be fitted in the positioning hole provided in the optical system holder 21 is formed by a spherical surface. Thereby, the positioning projection part 70 can be formed rotationally symmetrically. The spherical projection 80 is formed into a part of a sphere with a height equal to or less than the radius, that is, a spherical crown shape obtained by cutting a sphere at a plane.

The positioning projection part 70 is formed so that a projection 81 and the spherical projection 80 project opposite to each other from the upper and lower surfaces 83a and 83b of a disk-shaped flange 83. The projection 81 is fitted in the positioning hole 73 of the intermediate member 23, and has a truncated right circular conical shape. It can be shaped into a columnar shape.

The flange 83 is formed so as to have a diameter longer than the maximum diameters of the spherical projection 80 and the projection 81. The projection 81 and the spherical projection 80 project perpendicularly to the upper and lower surfaces 83a and 83b of the flange. Therefore, the center of the spherical projection 80 is on the rotational axis. Therefore, the positioning projection part 70 can be formed rotationally symmetrically. In addition, the projection 81 and the spherical projection 80 are formed based on the upper and lower surfaces 83a and 83b of the flange 83, so that they can be formed with high accuracy, and inspection can also be performed with high accuracy. Such a positioning projection part 70 can be formed with high accuracy since it is formed by cutting in a rotational symmetrical shape, however, in the case of mass production, it is preferably formed by molding. It is also allowed that the spherical projection 80 is formed into a spherical zone shape obtained by cutting a sphere at, for example, two parallel planes. The upper and lower surfaces 83a and 83b of the flange 83 are parallel to each other. The other positioning projection part 71 is also formed into the same shape as that of the positioning projection part 70.

On the attaching surface 21b, concave portions 78 and 79 in which the flange 83 enters are formed. The concave portions 78 and 79 have depths equal to the thickness of the flange 83. In the bottom 85 of the concave portion 78, a positioning hole 75 in which the spherical projection 80 is fitted is formed. The bottom surface 85 except for the positioning hole 75 comes into contact with the lower surface 83b of the flange 83 to regulate the positioning projection part 70 so that the rotational symmetrical axis becomes parallel to the perpendicular 86 to the attaching surface 21b. The bottom surface of the concave portion 79 regulates the positioning projection part 71 in conjunction with the lower surface 83b of the flange 83 of the positioning projection part 71 so that the rotational symmetrical axis becomes parallel to the perpendicular 86 to the attaching surface 21b.

The positioning hole 75 is formed into a spherical surface 82 with the same radius as that of the spherical projection 80. The depth S of the spherical surface 82 is equal to the height (H) from the lower surface 83b of the spherical projection 80. Thus, by forming the positioning hole 75 into a spherical surface, even if the attaching surface 21b of the optical system holder 21 is inclined at an acute angle α with respect to the surface 37 orthogonal to the sliding direction of the slide core 36, metallic molding with high accuracy at low costs without undercut is realized. The positioning hole 76 is formed in the same shape as that of the positioning hole 75.

In this embodiment, the positioning projection parts 70 and 71 are attached to the optical system holder 21 in advance. For this attachment, the spherical projections 80 are inserted in the positioning holes 75 and 76. At this time, the flanges 83 enter the concave portions 78 and 79, the lower surfaces 83b come into contact with the bottom surfaces 85, and the center axes of the projections 81 reliably become parallel to the perpendicular to the attaching surface 21b. Thereafter, the intermediate member 23 is attached to the optical system holder 21. At this time, the projection 81 is fitted in the positioning hole 73, and the position of the intermediate member 23 is determined with respect to the attaching surface 21b. Furthermore, the fitting surface (attaching surfaces 21b and 29) of the intermediate member 23 and the optical system holder 21 and the attaching surface 29 between the upper surface 83a of the flange 83 and the attaching surface 29 of the intermediate member 23 come into close contact with each other since the length of depths of the concave portions 78 and 79 are set equal to the thickness of the flange 83. Thus, by forming the positioning holes 75 and 76 in spherical surface shapes in the member to which the positioning projection parts 70 and 71 are attached in advance, assembly can be easily performed.

As the positioning holes 75 and 76, spherical surface shapes that come into contact with the outer circumferences of the spherical projections 80 without gaps are used, however, without limiting to the spherical surfaces, the holes can be shaped so as to have, for example, a plurality of inclined planes with V-shaped sections in the X and Y directions in a two-dimensional plane. According to this, positioning can be performed by contact at four points on the outer circumference of the spherical projection 80. The same effect can also be obtained when the positioning holes 75 and 76 are provided with three inclined planes to position the outer circumferences of the spherical projections 80 at three points.

The positioning hole 75 is for positioning in both X and Y directions in a two-dimensional plane. If such a positioning hole 75 is also applied to the other positioning hole 76, the distance between the positioning holes 75 and 76 cannot be set accurately, so that all spherical projections 80 and projections 81 hardly fit the positioning holes 75 and 76 and the positioning holes 72 and 73. Therefore, only one hole is set as the positioning hole 75 for positioning in both X and Y directions, and the residual positioning hole 76 is formed into, for example, a hole formed by V-shaped surfaces that have play in either one of the X or Y direction, and determines the position in only the other direction. Furthermore, two positioning holes 72 and 73, concave portions 78 and 79, positioning holes 75 and 76, and positioning projection parts 70 and 71 are formed for positioning, however, without limiting to this number, three or more, that is, a plural number can be provided for positioning.

In addition, in the embodiment described in FIG. 9 and FIG. 10, the positioning projection part 70 separately formed is used, however, instead of this, it is also possible that the positioning projection part 70 is insert-, post-insert-, or outsert-molded at the time of molding of the intermediate member 23 and formed integrally with the intermediate member 23. Furthermore, the positioning holes 75 and 76 provided in the optical system holder 21 are formed into holes with spherical surfaces, however, it is also possible that the positioning holes 72 and 73 provided in the intermediate member 23 are formed into holes with spherical surfaces instead. In this case, the attaching direction is only reversed, so that the positioning projection part 70 the same in shape can be used.

In addition, the positioning holes 75 and 76 provided in the optical system holder 21 are formed by spherical surfaces, so that even when an optical system holder 21 having an attaching surface 21b with a different angle α with respect to the surface 37 orthogonal to the sliding direction of the slide core 36 is used as the optical system holder 21, the positioning projection 70 can be used as a common part.

In the embodiments described above, the optical system holder 21 to be used in an RPTV and the intermediate member 23 to be attached to the optical system holder are provided with the positioning projections 25 and 26 and positioning holes 30 and 31, however, as parts to be provided with the positioning projections 25 and 26 and positioning holes 30 and 31, parts other than the optical system holder 21 can be used, and without limiting to the parts of an RPTV, parts to be used for other optical equipment can be used. Particularly, the invention is preferably employed for positioning between a mirror or prism that needs an accurate holding angle or a part for holding an optical system such as a lens that needs optical axis adjustment and a mating part.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-99083 and JP2005-275051, filed Mar. 30 and Sep. 22 of 2005, respectively, the contents of which is incorporated herein by reference.

What is claimed is:

1. A positioning structure comprising two parts to be attached to each other, wherein one of the two parts has an attaching surface having a positioning projection, the other of the two parts has an attaching surface having a positioning hole, and the two parts are positioned by fitting the positioning projection and the positioning hole when the two parts are attached to each other, wherein one of the two parts comprises a resin material and is formed by means of metallic molding, and the attaching surface of the one of the two parts is inclined within an acute angle with respect to a direction orthogonal to an opening and closing direction of a mold for forming the attaching surface;

the positioning projection or hole on the attaching surface is formed simultaneously by the metallic molding, and the positioning projection or hole has an outer or inner surface coming into contact with the positioning hole or projection of the other of the two parts, the outer or inner surface having a side surface with a rotationally symmetric trapezoid section having tapered side surfaces inclined within an acute angle with respect to a perpendicular to the attaching surface; and the positioning structure satisfies formula:

$$\beta - \alpha > 0$$

wherein $\alpha$ represents an angle of inclination of the attaching surface with respect to the direction orthogonal to the opening and closing direction of the mold is defined, and $\beta$ represents an angle of inclination of the tapered surface with respect to the direction orthogonal to the opening and closing direction of the mold.

2. The positioning structure according to claim 1, wherein the positioning hole has a concave portion including a straight portion parallel to the opening and closing direction of the mold, the concave portion extending from a contour of a bottom of the positioning hole.

3. A positioning structure comprising: two parts to be attached to each other, wherein each of the two parts has a positioning hole; and a positioning projection part, and the two parts are positioned by fitting the positioning hole of each of the two parts with the positioning projection part when the two parts are attached to each other,
wherein
one of the two parts comprises a resin material and is formed by means of metallic molding, and the attaching surface of the one of the two parts is inclined within an acute angle with respect to a direction orthogonal to an opening and closing direction of a mold for forming the attaching surface;
the positioning projection part comprises: a disk-shaped flange; a projection projected from one surface of the flange in an axial direction passing through a center of the flange; and a spherical projection projected from the other surface of the flange in the axial direction, so that the positioning projection as a whole becomes rotationally symmetrical with respect to the axial direction;
the projection fits the positioning hole of one of the two parts, and the spherical projection fits the positioning hole of the other of the two parts;
the spherical projection has a spherical surface with a height equal to or less than a radius thereof;
the positioning hole on the attaching surface of one of the two parts has one of an inclined plane and a concave spherical surface, the inclined plane coming into contact with the spherical projection at least at three or more points, the concave spherical surface having the same radius as that of the spherical projection and the same depth as the height of the spherical projection; and
the surface of flange having the spherical projection is formed so as to come into entire contact with a plane of the attaching surface when the spherical projection fits the positioning hole.

4. The positioning structure according to claim 1, wherein one of the two parts is an optical system holder that holds an optical path converter, the optical path converter bends at an acute or obtuse angle a principal optical axis of image light outgoing from a rear lens group and makes the image light incident on a front lens group along the bent optical axis; and the front and rear lens groups comprising two divisions of a projector lens in a projector, the front lens group being a front division of the two divisions in a direction of the principal optical axis, and the rear lens group is a rear division of the two divisions in the direction of the principal optical axis.

5. The positioning structure according to claim 4, wherein the optical system holder has an attaching surface having a front holder frame that holds the front lens group or an intermediate member that supports the front holder frame, and
the optical system holder has a reference surface perpendicular to the opening and closing direction of the mold, the reference surface having a rear holder frame that holding a part or the whole of the rear lens group.

6. The positioning structure according to claim 3, wherein one of the two parts is an optical system holder that holds an optical path converter, the optical path converter bends at an acute or obtuse angle a principal optical axis of image light outgoing from a rear lens group and makes the image light incident on a front lens group along the bent optical axis; and the front and rear lens groups comprising two divisions of a projector lens in a projector, the front lens group being a front division of the two divisions in a direction of the principal optical axis, and the rear lens group is a rear division of the two divisions in the direction of the principal optical axis.

7. The positioning structure according to claim 6, wherein the optical system holder has an attaching surface having a front holder frame that holds the front lens group or an intermediate member that supports the front holder frame, and
the optical system holder has a reference surface perpendicular to the opening and closing direction of the mold, the reference surface having a rear holder frame that holding a part or the whole of the rear lens group.

* * * * *